Jan. 20, 1931.　　　　W. R. BOONE　　　　1,789,803
COTTON GATHERER
Filed June 20, 1928
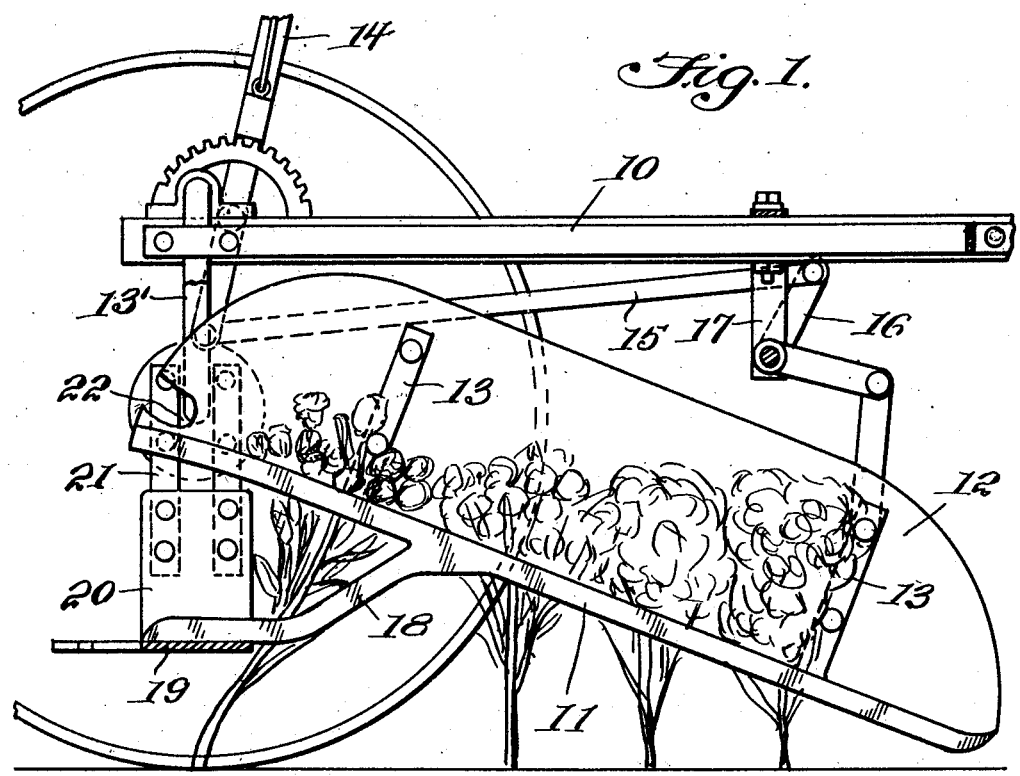
Fig. 1.
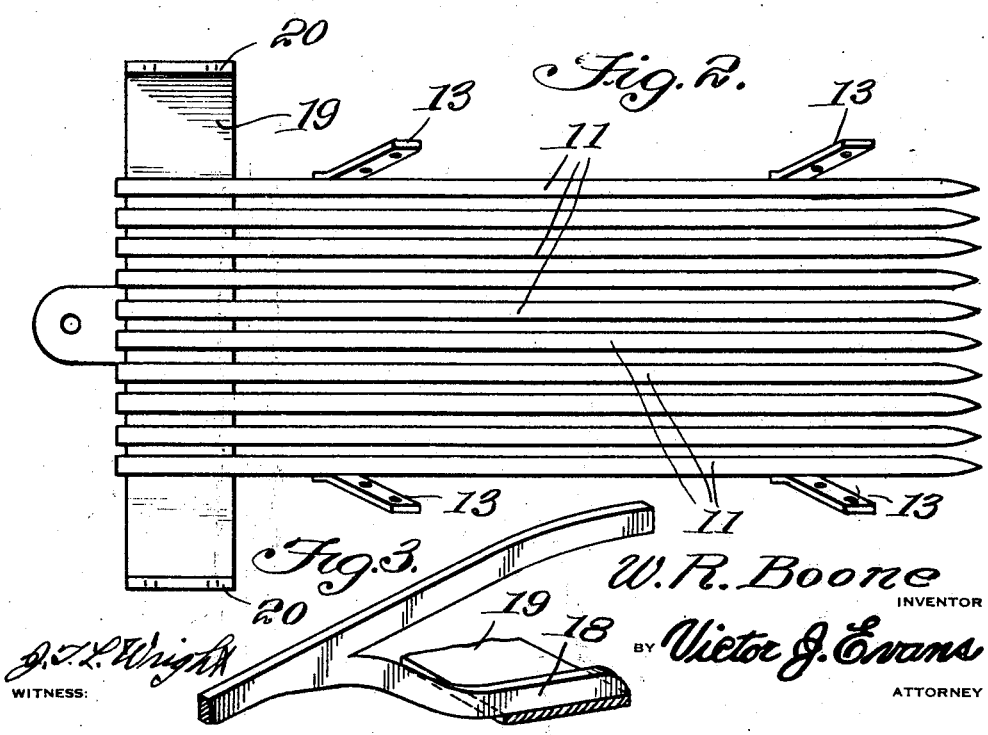
Fig. 2.
Fig. 3.
W. R. Boone
INVENTOR
BY Victor J. Evans
ATTORNEY
WITNESS:

Patented Jan. 20, 1931

1,789,803

UNITED STATES PATENT OFFICE

WALLIE R. BOONE, OF LUBBOCK, TEXAS

COTTON GATHERER

Application filed June 20, 1928. Serial No. 286,897.

This invention relates generally to cotton gatherers, and more specifically to the cotton stripping member designed to facilitate stripping of the cotton from the plants or stalks, and to prevent choking at a point on the member where the stalks or plants pass from the latter.

Stripping members of the character above mentioned are usually provided with a plurality of spaced fingers supported by a suitable cross plate or bracket, which supports the stripping member on the machine. The plants and stalks are adapted to pass between the fingers during the stripping operation, but when the stalks strike the cross plate or bracket, the plants are sometimes injured, while invariably the stripping member becomes choked with the separated cotton, materially reducing the efficiency of the machine.

It is therefore the object of the present invention to provide the stripping member with a plurality of auxiliary fingers suitably spaced apart and arranged beneath the stripping fingers, the auxiliary fingers supporting the stripping member in spaced relation to the bracket in a manner so that the plants or stalks can pass freely between the stripping fingers and eliminate any clogging of the member with the separated cotton.

The nature and advantages of the invention will be better understood when the following detail description is read in connection with the accompanying drawing, the invention residing in the construction, combination and arrangement of parts as claimed.

In the drawing forming part of this application like numerals of reference indicate similar parts in the several views and wherein:

Figure 1 is a fragmentary side elevation of a machine showing the manner of supporting the stripping member thereon.

Figure 2 is a plan view of the stripping member.

Figure 3 is a fragmentary detail view thereof.

Referring to the drawing in detail 10 indicates the frame of the machine from which is suspended the stripping member hereinabove referred to. This member includes a plurality of spaced stripping fingers 11 and opposed side walls 12, the latter being supported by bracket arms 13 rising from the two outermost fingers 11 as illustrated. The entire device is pivotally supported upon a suitable axle 13' so that it may be raised or lowered with relation to the size of the plants, the device being adjusted in this manner by means of a lever 14 located within convenient reach of the operator. The lever is connected with an operating rod 15 which in turn is connected with bell cranks 16, the latter being pivoted on a suitable bracket 17 as illustrated in Figure 1. As the machine moves over the ground or surface, the plants or stalks pass between the fingers 11, and due to the inclination of these fingers with relation to the ground it is manifest that the cotton is stripped from the plants during the progress of the machine.

In accordance with the present invention the fingers 11 are provided with auxiliary fingers 18, the latter projecting downwardly for a portion of their length and thence rearwardly as clearly illustrated in Figure 1, the fingers 18 being secured in any suitable manner to the cross member of a substantially U-shaped bracket 19 utilized to support the stripping member on the machine. The parallel portions 20 of the bracket have riveted or otherwise secured thereto spaced bars 21 connected by a plate 22 having openings to receive the axle 13' upon which the entire stripping device is pivotally mounted for the purpose above stated. By reason of this construction and arrangement the stripping fingers 11 are wholly separated and spaced from the bracket 19, so that the latter does not in any way interfere with the movement of the fingers over the plants or stalks. In other words while the plants or stalks are slightly deflected by the bracket 19 when contacted thereby, it is manifest that all of the cotton is stripped from the plants without any interference on the part of the bracket, and allowed to pass freely over the fingers to be discharged from the upper end of the device. As hereinabove stated the arrangement avoids choking up of the device at a point near its upper end when the bracket 19 is supported directly by the stripping fingers 11. Consequently the design and arrangement of the fingers 18 materially increases the efficiency of the machine for the purpose intended.

While it is believed that from the foregoing description the nature and advantages of the invention will be readily understood, I desire to have it known that I do not limit myself to what is herein shown and described and that such changes may be resorted to when desired as fall within the scope of what is claimed.

What is claimed is:

1. In a cotton gatherer, a stripping device including a supporting bracket, a plurality of spaced parallel fingers, and means for supporting the fingers on said bracket and spaced above the bracket.

2. In a cotton gatherer, a stripping device including a plurality of spaced parallel fingers, a transverse bracket supported by the machine, and means carried by said fingers for supporting the latter upon the bracket and spacing the fingers from the bracket.

3. In a cotton gatherer, a stripping device including a plurality of spaced parallel fingers, a transversely disposed supporting bracket supported by the machine, auxiliary fingers depending from the first mentioned fingers, and arranged to support the latter on the bracket and spaced from the bracket, said stripping device being mounted for pivotal movement, and means for adjusting the device with relation to the ground.

4. In a cotton gatherer, a stripping device including a plurality of spaced parallel fingers, a transversely disposed supporting bracket, auxiliary fingers depending from the first mentioned fingers and forming an integral part of the latter, and arranged at one end of the stripping device to support the latter spaced above the bracket and said auxiliary fingers terminating short of the adjacent ends of the first mentioned fingers.

In testimony whereof I affix my signature.

WALLIE R. BOONE.